No. 891,340. PATENTED JUNE 23, 1908.
R. HUFF.
VALVE OPERATING MECHANISM FOR HYDROCARBON ENGINES.
APPLICATION FILED OCT. 1, 1907.
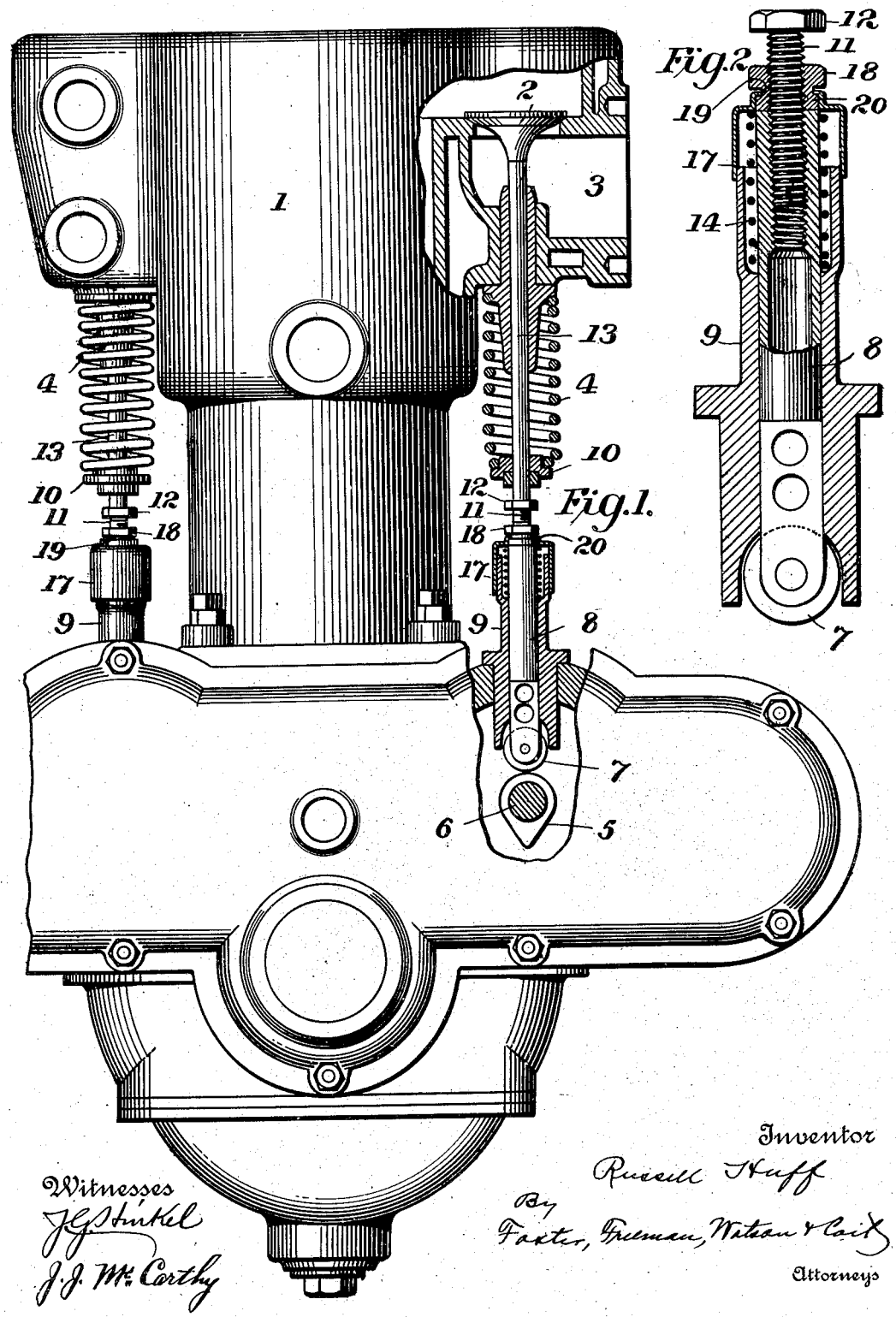

# UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF WEST VIRGINIA.

VALVE-OPERATING MECHANISM FOR HYDROCARBON-ENGINES.

No. 891,340.  Specification of Letters Patent.  Patented June 23, 1908.

Application filed October 1, 1907. Serial No. 395,378.

*To all whom it may concern:*

Be it known that I, RUSSELL HUFF, a citizen of the United States, and resident of Detroit, county of Wayne, and State of Michigan, have invented certain new and useful Improvements in Valve-Operating Mechanism for Hydrocarbon-Engines, of which the following is a specification.

This invention relates to valve operating mechanism for hydrocarbon explosive engines used on motor vehicles and particularly to the dust-guard which covers the joint between the sliding valve operating rod and the tubular support for it.

In the accompanying drawings, Figure 1 is a view partly in section showing the portion of a hydrocarbon engine having my improvement thereon; Fig. 2 is a sectional view of a portion of the valve operating mechanism including my present improvement.

In this drawing, 1 represents the cylinder of an explosive engine and 2 the valve which regulates the passage of the gases through the opening 3. This valve is normally held to its seat by a spring 4 bearing against the casing and against the washer 10 secured to the valve rod 13. Directly below the lower end of the valve rod 13 and in line therewith is mounted the tubular guide 9. The tubular roller holder or sliding member 8 fits closely the interior of the guide 9 and carries at its lower end the roller 7, which is operated by the cam 5 on the shaft 6. This tubular sliding member is provided with screw threads on its interior at the upper end which receive the screw 11 which is provided at its top with the head 12 which makes contact with the lower end of the valve rod 13. A lock nut 18 is placed upon the screw 11 and is adapted to be screwed down tight against the end of the sliding member 8 and by this means the screw 11 may be adjusted to various heights and locked in any desired position. The upper portion of the nut 18 is provided with angular faces so that it may be turned by means of a wrench and is provided midway its length with an annular groove 19. The part of the nut below this groove marked 20 is made cylindrical in form.

Surrounding the upper end of the guide 9 and making close sliding contact therewith is the tubular dust guard 17 which has its upper end bent inward against the cylindrical portion of the nut and into the groove in the nut. This dust guard is preferably made of sheet metal and its upper portion is spun into the groove and against the cylindrical portion of the nut, thus making a firm and solid connection between the nut and the dust guard. It will be understood that other means for permanently securing the guard to the sides of the nut may be adopted without departing from my invention in its broader aspects and that the particular means above described is merely the one which I prefer and which I regard as having advantages over other means.

Before making the present invention I provided the dust guard with an inturned flange fitting between the nut 18 and the upper end of the sliding member 8 and clamped it firmly in place between these parts. It was found however that the constant adjustment of the mechanism would soon wear away the flange and the dust guard would be useless and it was in seeking to overcome this difficulty that I conceived the construction in which the guard is fastened to the nut permanently above its bottom where it will not be subjected to the wear due to adjustment.

I have shown in the drawing a spring 14 within the guide 9 bearing against the under surface of the dust guard 17, which spring tends to keep the head 12 of the screw 11 in contact with the valve rod, but it is to be understood that this spring is not essential and forms no part of my present invention.

My invention relates primarily to the dust guard and means for supporting it in its relation to the joint between the two sliding parts and it is to be understood that the specific forms of the various parts of the mechanism shown are not essential to the present invention.

Having described my invention what I claim and desire to secure by Letters Patent is, 1. A dust guard for sliding connections consisting of a nut and a tubular metal portion of greater diameter having one end bent inward and permanently secured to the sides of the nut between its ends.

2. A dust guard for sliding connections consisting of a nut provided with a circumferential groove and a tubular metal portion of greater diameter having its end spun into said groove.

3. A dust guard for sliding connections consisting of a screw threaded nut having on its outer surface a circumferential groove the surface of said nut on one side of said groove being angular and upon the other cylindrical, in combination with a cylindrical metal portion having a diameter greater than the nut and having its end spun down in close contact with the cylindrical portion of the nut and into the groove therein.

4. The combination with a tubular guiding member, of a sliding member mounted therein, an adjustable nut carried by the sliding member beyond the end of the guiding member and being provided with a circumferential groove, and a dust cap closely fitting and slidably engaging the end of the guiding member and having its ends spun into the circumferential groove of the nut.

5. In valve operating mechanism for hydrocarbon engines, the combination with the operating rod of the tubular guiding member through which it slides, an adjustable screw threaded nut mounted on said rod beyond the end of said guiding member and provided with a circumferential groove and a tubular dust guard fitting over the end and for some distance down the sides of the guiding member, the end of said dust guard being spun into the groove in the nut.

6. In valve operating mechanism for hydrocarbon engines, the combination with the tubular supporting operating member, of an adjustable screw threaded rod engaging screw threads within the end of said member, a lock nut on said rod adapted to be screwed down against the end of said supporting member, a tubular guiding member through which the supporting member slides, and a tubular dust guard fitting over the end of the guiding member and permanently secured to the sides of the nut.

In testimony whereof I affix my signature in presence of two witnesses.

RUSSELL HUFF.

Witnesses:
 MILTON TIBBETTS,
 CLARA DALE.